Nov. 13, 1923.　　　　　　　　　　　　　　　　　1,473,895
G. H. WENHAM
FOLDING HOOD FOR MOTOR VEHICLES AND THE LIKE
Filed July 25, 1921　　　5 Sheets-Sheet 1
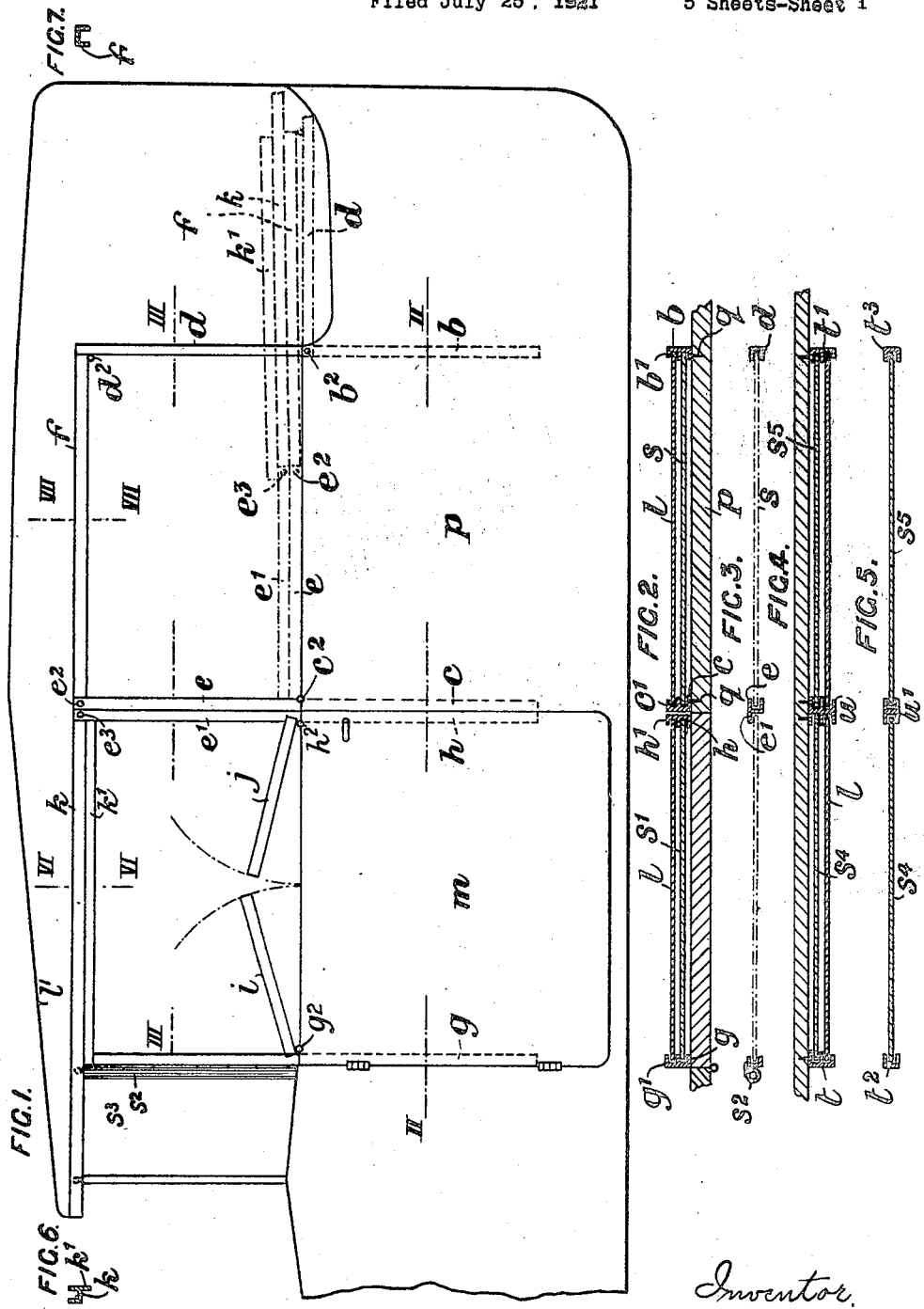
Inventor.
George Harold Wenham
By _____ Atty.

Nov. 13, 1923.   G. H. WENHAM   1,473,895
FOLDING HOOD FOR MOTOR VEHICLES AND THE LIKE
Filed July 25, 1921    5 Sheets-Sheet 2

Nov. 13, 1923.  
G. H. WENHAM  
1,473,895  
FOLDING HOOD FOR MOTOR VEHICLES AND THE LIKE  
Filed July 25, 1921   5 Sheets-Sheet 3
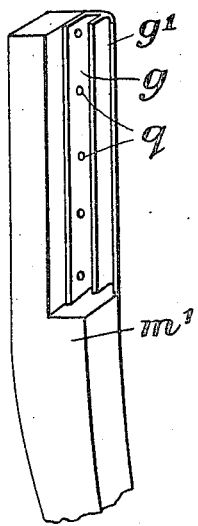
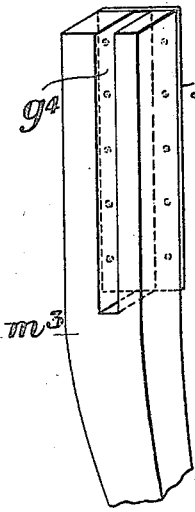
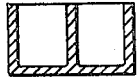
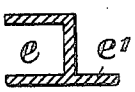
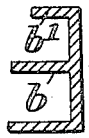
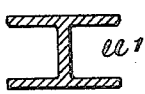
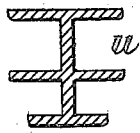
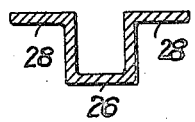

Nov. 13, 1923.  
G. H. WENHAM  
FOLDING HOOD FOR MOTOR VEHICLES AND THE LIKE  
Filed July 25, 1921    5 Sheets-Sheet 4

1,473,895

Inventor.  
George Harold Wenham.  
By [signature] atty

Nov. 13, 1923.

G. H. WENHAM 1,473,895

FOLDING HOOD FOR MOTOR VEHICLES AND THE LIKE

Filed July 25, 1921    5 Sheets-Sheet 5

Inventor
George Harold Wenham,
By  atty.

Patented Nov. 13, 1923.

1,473,895

UNITED STATES PATENT OFFICE.

GEORGE HAROLD WENHAM, OF BROMLEY, ENGLAND.

FOLDING HOOD FOR MOTOR VEHICLES AND THE LIKE.

Application filed July 25, 1921. Serial No. 487,477.

*To all whom it may concern:*

Be it known that I, GEORGE HAROLD WENHAM, a subject of the King of Great Britain, residing at Charnwood Cottage, London Lane, Bromley, Kent, England, have invented certain new and useful Improvements in Folding Hoods for Motor Vehicles and the like, of which the following is a specification.

This invention comprises improvements in and connected with the folding hoods and fixed heads of motor road vehicles and other vehicles such as, for example, motor boats. The invention is particularly applicable to the folding hoods or coverings of open touring cars, these hoods enabling such cars when desired, to be used as closed-in or coupé cars, in the well-known manner.

The object of these improvements is to provide a frame or frame unit for the folding hoods or fixed heads or coverings of vehicles as aforesaid, the said frame being not costly to make, of very light weight and good appearance and possessing advantageous characteristics as regards maximum light-openings combined with ability to open and close a door with its own independent sash or window pane in any position.

In frames or frame units of the kind referred to, it is of great advantage to be able to omit wooden pillars and rails as these add to the weight and, when they come between adjacent sashes or panes, reduce the light-openings and obstruct the vision. Also, it is of great advantage to provide, in a frame of this kind, for a door-window or sash to be quite independent of an adjacent window sash that descends into, say, a pocket in a panel, for, in this way, each of the sashes may then be adjusted to any desired position, as to height, and may remain in that position and not obstruct the door during the opening and closing of the latter.

According to this invention, a frame for a hood or head of the kind referred to, is composed entirely of light metal section-bars and comprises, at least, one upright channel section pillar secured to the body of the vehicle and extending up to the light section metal cant rail or head frame, the said pillar being adapted for affording support on the one side to a sash or pane, slidable up and down in guides in a pocket space in a door, and for affording guidance on the other or channel-side to a sash or pane, slidable up and down in guides in a pocket space in a panel, contiguous to the door, the two sashes or panes being in close proximity to one another, owing to the slight width of the intervening channel section pillar. The channel section pillars of the frame may extend down into window pockets in panels of the vehicle and thereby provide a continuous guide for the sashes or panes from the pockets up to the cant rails and, in the case of folding frame members, the pillars extending from the top of the vehicle body up to the cant rail may be hingedly connected with the guide members or portions contained in the pocket spaces aforesaid, so that the said pillars may be folded down on to the body, when not required to support the hood, or may be turned to an erect position to form a continuation of the sash guides in the said pockets. Channel-section bars or pillars constituting members of the frame or frame unit may be formed with flanges for making weather-proof joints with the sashes or sash guides in the closed condition of the sash. Channel pillars erected between two panel sashes may be H-section, each channel of the H providing a guide for a respective sash, and channel-section bars inserted as sash guides in pockets may be formed with an additional channel for the retention of lining-boards which close in the pocket spaces, in which the sashes or panes are contained, when in the lowered condition. The channel guides in window pockets may also be formed by slotting a frame-member and closing one side of the slot by means of a metal plate secured to the frame-member by screws or the like. Preferably, a complete frame-unit is constructed ready to be delivered to motor car or body builders, so that such builders are able to mount a folding hood or fixed head merely by fixing the lower parts of the section metal pillars and the like in the proper positions on the body of the car.

And in order that the invention may be more readily understood reference will be made to the accompanying drawings, in which:—

Figure 1 is a side elevation if a portion of the door side of a small car-body with a door on one side only, the hood being shown in full lines in the raised or closed position, and the frame being shown in chain lines in the folded down position.

Figure 2 is a plan section on the line II—II of Figure 1 through the left or door side.

Figure 3 is a section similar to Figure 2 but taken on the line III—III of Figure 1.

Figure 4 is a plan section corresponding to Figure 2, but taken on the opposite side of the car.

Figure 5 is a plan section corresponding to Figure 3, but taken on the opposite side of the car.

Figure 6 is a section of the cant rail on the line VI—VI of Figure 1.

Figure 7 is a section of the cant rail on the line VII—VII of Figure 1.

Figure 11 is a detail view in perspective showing a channel-iron guide attached to an upright member of a door or body frame member.

Figure 12 is a similar view of a modified construction of guide.

Figures 13 to 22 are cross sections to a larger scale of various section bars used in the construction of frames and guides in accordance with these improvements.

Figure 9:
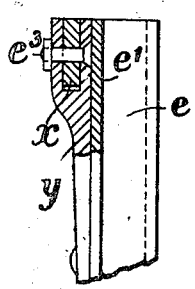
Figure 9 is a vertical section on the line IX—IX of Figure 8.
Figure 8:
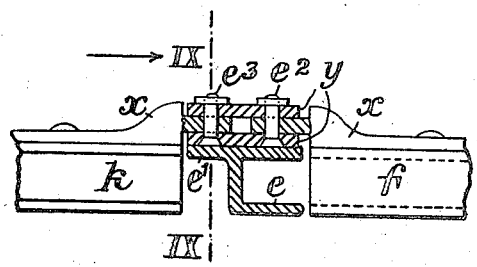
Figure 8, is a detail plan view partly in section, to a larger scale of one of the pillars and the cant-rails connected thereto.

In carrying the invention into effect, the lower guide pillars or channels, marked $b$ and $c$ Figures 1 and 2, are fixed to the car body, being secured to the panel $p$ by screws $q$ Figure 2, or the like passing through the holes in the said channels and into the panel or other suitable part of the body. Preferably, the sides of the body of the vehicle, including the doors, are vertical or nearly vertical. As shown in Figures 2 and 16, these guides are of double channel section, the smaller channels $b'$ and $c'$ respectively being adapted to take the lining-boards $l$ but these smaller channels are not indispensable. The channels $b$ and $c$ are adapted to receive and guide a pane or sash $s$, Figure 2, and are conveniently lined with felt or the like to diminish vibration or rattling. At $b^2$ and $c^2$, Figure 1, are hinged the upper guide pillars or channels $d$ and $e$, respectively. The pillar $d$ is of ordinary channel cross section and is adapted to receive the sash $s$ when raised. The pillar $e$ is of channel section and is also provided with a flange or extension $e'$ see Figures 3, 8 and 15. The channel portion $e$ serves, with the pillar $d$, to guide the sash $s$ when it is raised out of the window pocket behind or in the panel $p$, while the flange $e'$ serves as a jamb or draught excluder for window guides hereinafter described. One end of that part of the cant rail, marked $f$, to which the hood is attached, is hinged or pivoted, at $d^2$, to one end of the pillar $d$ and its other end is hinged or pivoted at $e^2$, see also Figure 8, to the pillar $e$. The other or front portion of the cant-rail $k$ is hinged at $e^3$ to the pillar $e$. As will be understood from Figures 8 and 9, the cant-rail portions $f$ and $k$ may have riveted or sweated on to them the male hinge-parts $x$, while the pillar $e$ $e'$ may have secured to its upper end the female hinge-parts $y$. The frame of the front of the hood $t'$ (Figure 1) and the web of the channel $k$ are each furnished with a hole (not shown) which holes, as usual, pass over the ends of the vertical supporting members or pillars $s^2$, of the wind screen $s^3$. The cant rail member $k$ also has a flange or extension $k'$, as shown in Figures 1 and 6, like that marked $e'$ on the hinged pillar $e$, the flange $k'$ serving as a weather strip for the sash or pane when the latter is raised to the closed position. The door $m$ Figures 1 and 2 is provided with two lower guide pillars or double channels $g$ $g'$ and $h$ $h'$; the channels $g$ and $h$ serving as guides for the door pane or sash $s'$ (Figure 2), while the smaller channels $g'$ $h'$ receive the lining boards $l$. Figure 11 illustrates, to a larger scale, a frame member $m'$ of a door, for example, furnished with such channels $g$ $g'$ fixed to the frame member $m'$ by screws $q$. If desired, however, the channels $g'$ $h'$ may be dispensed with. At the top of the channel $g$, Figure 1, is hinged, at $g^2$, a guide $i$, of simple channel section, and similarly, there is a guide $j$, hinged at $h^2$ to the top of the channel $h$. These guides $i$ and $j$ in their vertical positions, are adapted to receive the pane or sash $s'$ when raised, but when the sash is lowered in to the window pocket in the door $m$, the guides are suitably folded down on to the top of the door and thus cover or enclose the sash. If desired, the guide $i$ may be a fixture (integral with $g$) and upright, as it is never in the way, whether the hood be raised or lowered. When the pillar $e$ is upright, and the guide $j$ is raised to verticality, so that it rests in the angle between the web of the channel $e$ and its flange $e'$, the latter serves to exclude draught when the pane or sash $s'$ is raised. The top of the pane or upper rail of the sash may rest against the depending flange $k'$ of the cant rail $k$ when the window is fully closed, so that the flange $k'$ then acts as a weather strip as aforesaid. In this particular construction, the vehicle body has a door $m$ on one side only, Figures 4 and 5 are sections on the other side of the vehicle where there is no door. The sashes $s^4$ $s^5$ on the doorless side, when in the lowered position, rest in guides afforded by the double channels $t$ $u$ $t'$ seen in Figure 4, lining boards $l$ forming a pocket containing these sashes being supported by the inner channels of the section bars $t$ $u$ and $t'$ as described with reference to the sashes $s$ $s'$, the simple channels $t^2$ $t^3$ Figure 5 forming upward extensions of the guide channels in $t$ $t'$ and the H-section bar $u'$ forming an upward extension of the guide channels for the sashes $s^4$ $s^5$ in the double channel bar $u$. The bars $t^3$ and $u'$, at least, are hingedly mounted like the channels $d$ $e$. The front and rear portions of the cant rail, on the doorless side, are conveniently of channel section, inverted, to receive the sashes when raised in the same manner as the length $f$ of cant rail in Figures 1 and 7.

In Figure 11, a channel, guide $g$ $g'$, such as seen in Figure 2, is shown secured by screws $q$ in a cut-away portion of a wooden frame member $m'$, whereas in Figure 12, instead of using light channel section metal, the wooden frame members (such as that marked $m^3$) are slotted, at at $q^4$ the slots being of such a width and depth as to accommodate and guide the sash or window and the outer side of each slot $q^4$ being closed by means of a metal plate $q^5$. in Figure 12, fixed thereto by screws or otherwise. The guides or pillars for guiding the sashes, when raised, are hinged at the foot to the top of the carriage body or to the plates $q^5$ or to the channel section irons such as $b$, $c$ and $g$ and $t'$, $u$ and $t$ as the case may be, and the said pillars are hinged or connected at the top to the cant-rail or longitudinal frame member of the head. The channels or plates may have pivot pins or studs or similar hinge devices sweated, riveted or otherwise secured to their sides for enabling them to be hingedly mounted, as aforesaid.

Figure 10:
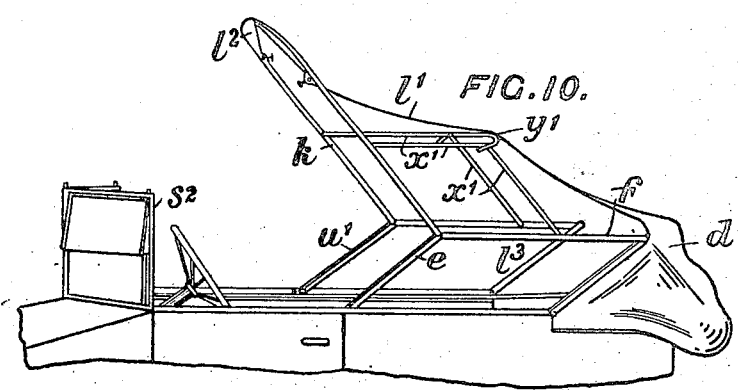
Figure 10 is a perspective view of the upper part of the car body with the hood in a partly closed position.

Figure 10 is a view showing the position of the pillars $d$, $t^3$ $e$ and $u$, the front portions $k$ of the cant rails and the rear portions $f$ during the lowering of the hood $l'$ which may be made of leather, leather cloth, canvas or other appropriate material or fabric. The hood is of the known type not connected to the cant rails between the the points $s^2$ and $d^2$, Figure 1. At the front, it is rigidly connected to the usual solid wooden front $l^2$. When the hood is released from the pillars $s^2$ of the wind screen and the cant-rails $k$ are folded back on the cant rails $f$, the cross bar or bridge piece $y'$, operated by the links $x'$, causes the hood to clear the back seat and the occupants, if any, the cant rails $f$ (with the cant rails $k$ thereon) sink down just above the waist rail or top of the car body, while the pillars $e$ and $d$ and also those marked $u'$ and $t^3$ are swung over to the rear and finally come to rest in the horizontal position, all as indicated in chain lines in Figure 1.

Figure 13, shows the simple channel-section which is of almost universal application in connection with this invention. For example, it may be used for cant rails as shown at $f$, Figures 1 and 7, for the near side of the vehicle and wherever there is a window not mounted in a door. It is applicable to pillars, such as $d$, Figures 1 and 2, and $t^2$, $t^3$, Figure 5, where there is no door, and to lower guides such as $b$, $c$, $h$ and $g$, Figure 1, for as aforesaid, it is not essential that the lower guides should be formed of double-channel section to receive a panel as well as a window in its lowered condition and as shown in Figures 2 and 4.

Figure 14 represents a double channel more suitable for cant rails than for pillars. For instance, this section of channel bar may be used inverted instead of the simple channel $f$ (Figures 1 and 13) or wherever there is no door beneath a cant rail. It may also be used instead of the double channel section, marked $b$ $b'$ or $c$ $c'$ or $h$ $h'$ or $g$ $g'$ in Figures 1 and 2 or $t$ or $t'$ in Figure 4, but for lower guides the section shown in Figure 16 is preferred.

Figure 17 is a section suitable for use as an upper pillar, such as the pillar $u'$ Figure 5, interposed between adjoining sashes. Figure 18 shows a section suitable for use in positions such as that of the pillar $u$, Figure 4.

Figure 19 is a simple angle or L-section useful for cant-rails.

Figure 20 shows a T-section more suitable for cant-rails than for pillars. It is used for example in lieu of the channel bars marked $f$ and $k$ $k'$ in Figure 1.

Figure 21, shows a section of a tube with a longitudinal groove or recess and this channel section may be used for cant rails and pillars, in fact, wherever the section shown in Figure 13 is employed.

Figure 22 is a section of a pillar described later on with reference to the construction shown in Figure 26.

Figure 23:
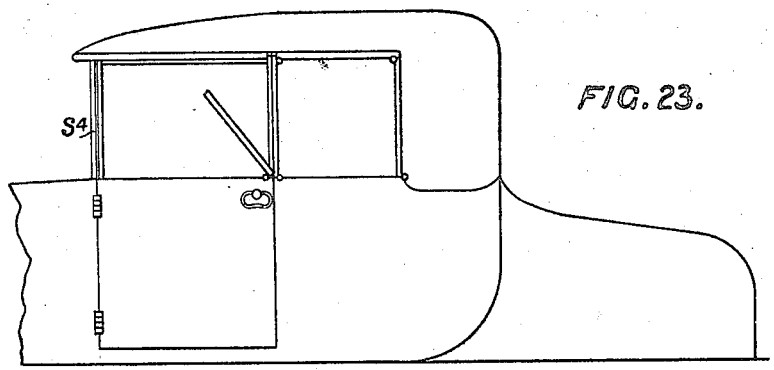
Figures 23 and 24, are elevations of modified constructions of car bodies and hoods fitted thereto having frames and guide pillars in accordance with these improvements.

The construction shown in Figure 23 is the same as in Figure 1, the only difference being a matter of design to suit a two-seater body instead of a four-seater body and that the wind screen $s^4$ is flat instead of V-shaped.

Figure 24:
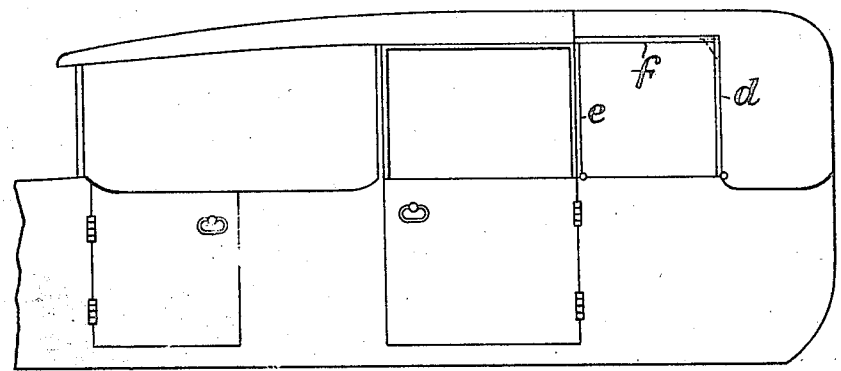
Figure 25:
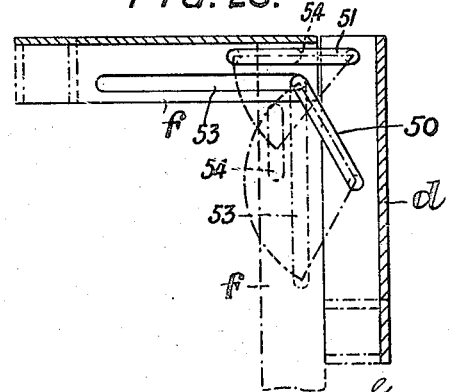
Figure 25 is a detail view of a joint seen in Figure 24.

Figures 24 and 25 show the invention applied to a limousine-landaulette, the roof over the driver's compartment and the portion of roof over the door to the main compartment being fixed, while the rear hood portion folds back.

As shown in Figure 25, the cant rail $f$ is not hinged to the pillar $d$ but is connected thereto by two links 50 and 51 of unequal length, the link 50 being pivoted at one end to the pillar $d$ while its other end engages by a stud in a slot 53 in the cant rail $f$, the link 51 is also pivoted at one end to the pillar $d$ and its other end engages by a stud in a second slot 54 in the said rail $f$ and so that the cant rail may fold down parallel to the said pillar.

Figure 26:
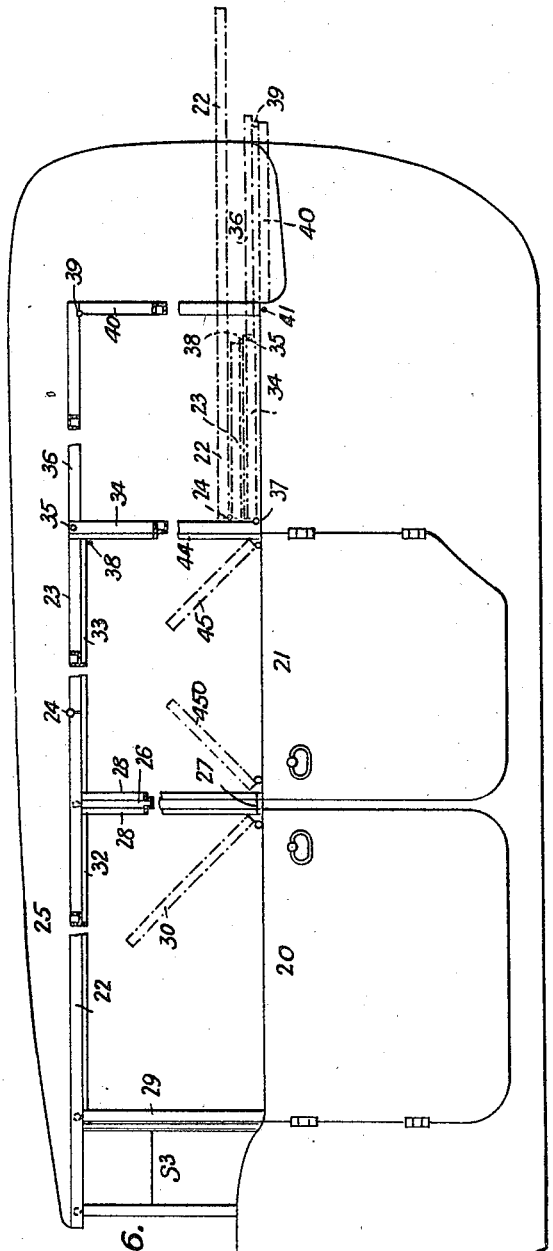
Figures 26 and 27, are other constructions of car bodies fitted with hood frames constructed in accordance with these improvements.

Figure 26 illustrates a motor car body with two doors 20 and 21 on each side. Or there may be one door 20 on one side to gain access to the driver's seat and a door 21 on one side or on both sides to the compartment at the rear of the driver's seat, the wind screen $s^3$ being, for example, of the V type, as in Figure 1.

The cant rails are each made in several parts 22, 23 and 36, the parts 22, 23 being hinged together at 24, a short distance to the rear of the driver's seat. The front part of the hood 25 is adapted to be turned up about the hinge 24 and folded back on top of the rear portion of the hood when the latter is folded down. At the rear of the driver's seat or forming the back of the latter is a transverse partition, in the plane of the pillars 26, to divide the body into two compartments. This partition is preferably (but not necessarily), made hollow to receive a window or windows to entirely separate the rear compartment from the driver's compartment. The pillars 26 are hinged at 27 on each side of the body so as to be foldable, in the plane of the partition, across the rear of the driver's seat on to the partition. If there is to be a window, the pillars 26 are, conveniently, made of channel section to receive the window, housed in the partition, and with flanges 28, 28 see also Figure 22, to form a weather strip for the windows housed in the doors 20 and 21. The top of the pillar 26 is, suitably, provided with a knob or catch device for taking into a slot or hole formed in the cant rail 22 for the purpose of retaining the pillar 26 in the erect position. The door 20 on the driver's compartment is provided on one side with a fixed window-guide pillar 29 and on the other side with a hinged window-guide pillar 30 but both guide-pillars 29 and 30 may be hinged if desired, as in the case of the construction in Figure 1. The angle between the forward flange 28 and the adjacent wall of the channel pillar 26 serves to receive the hinged guide pillar 30 on the door, as in the case of the channel $e$ and flange $e'$ in Figure 1. Obviously the guide pillars on the door may be hingedly mounted as described with reference to Figure 1, and the channel sections in the door and in the panels may also be similar to those described with reference to Figure 1. Those parts of the cant rails which come over the windows of the doors are provided with depending flanges 32 and 33, like the flange $k'$, Figures 1 and 6. The second or rear door 21, may have two hinged guide pillars 45 and 450 to accommodate its windows, these pillars folding down on top of the sash in its lowered position, or one guide pillar folding down on top of the other. Otherwise one guide pillar may be dispensed with, preferably the front one, the sash then fitting against the rear flange 28 of the transverse folding pillar 26.

The pillar 34 at the rear of the rear door 21 is hinged at 35 to the cant rail 36 and also at 37 to the lower fixed pillar or to the body so as to fold down to the rear. This pillar 34, is, conveniently, provided with a flange 44 to form an angle to receive the hinged guide 45. The cant-rail 36 is hinged at 35 at the rear of the pillar 34 and the front of this pillar 34 is hinged, at 38, to the intermediate section 23 of the cant-rail which only extends for a short distance to the front and is, as aforesaid, there hinged, at 24, to the front portion or section 22 and, consequently, this intermediate section 23 may be folded down on to the pillar 34 in the lowered position, while the front section 22 is folded back on top of the intermediate section 23 as seen in dotted lines. The rear portion 36 of the cant rail is also hingedly connected at 39 to a third pillar 40 which, in turn, is hinged at 41 to a lower fixed pillar or to the body and a window pocket is made in the panel between the pillars 34 and 40, the ararngement of the sash being the same as described with reference to the doors. Obviously, where there is no door, the pillars may be modified accordingly, and as will be now well understood after a comparison of Figures 3 and 5. The invention is applicable to the bodies of different kinds of motor cars and provides a very large and unrestricted view through the windows. The weight of such a hood or top is, relatively, small and the hood or top has a very light appearance. Naturally, if the car body have a fixed head instead of a hood the pillars are fixed and rigid.

Figure 27:
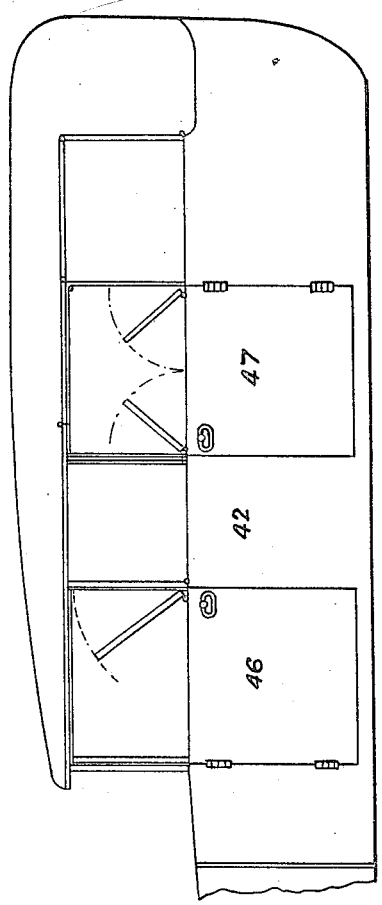

With slight modification, the invention is applicable to a longer car body, as shown in Figure 27, by providing a panel 42 having a window pocket and sash between the two doors 46 and 47 and irrespective of whether the hood be folding or the head be a fixed one or partly fixed and partly folding as in the landaulet type of body.

I claim:—

1. In a motor vehicle and the like, a combined sash-frame and hood support comprising light sheet-metal channel bars substantially E-shaped in cross section each forming two recesses in parallel relation in a door of the vehicle body, a sash slidably mounted in one of the recesses of each of said bars, a cover plate mounted at each end in the other recess of each bar, light sheet metal channel bars fixed in parallel relation in the sides of the vehicle body, light sheet-metal bars U-shaped in cross section pivotally connected to the upper ends of the fixed bars and forming extensions of the latter and arranged to receive the sash, and light sheet-metal cant rails substantially U-shaped in cross-section pivotally connected to the free ends of the extension bars and arranged to receive the upper edge of the sash.

2. In a motor vehicle and the like, a combined sash frame and hood support comprising light sheet metal channel bars substantially E-shaped in cross-section fixed in parallel relation on the closed side of the vehicle body, a pair of similar channel bars fixed on the door side of said body and disposed opposite to bars on the closed side, a second pair of similar bars fixed to the door of the vehicle and disposed opposite to corresponding bars on the closed side, said channel bars both on the closed and door sides forming two recesses in parallel relation, a sash slidably mounted in one of the recesses of each of said bars, a cover plate mounted at each end in the other recess of each bar, a light sheet metal bar U-shaped in cross section pivotally connected to the upper end of each of the E-section channel bars and forming extensions thereof to receive the sashes when raised, said extensions of the door channel bars being adapted to be folded on to the upper edge of the door when the door sash is lowered, forward light sheet metal cant rails of substantially U-shaped cross section one on each side of the vehicle, a pivotal connection between the rear end of the door-side cant rail and the free end of the extension of the E section channel bar on the vehicle body adjacent the rear of the door opening, a pivotal connection between the rear end of the cant rail on the closed side of the vehicle body and the free end of the extension of the E section channel bar opposite the aforesaid channel bar, rearward light sheet metal cant rails of substantially U-shaped cross section forming rearward extensions of said forward cant rails, pivotal connections between the forward ends of the rear cant rails and the free ends of the extensions to which the forward cant rails are pivoted, and pivotal connections between the rear ends of said rear cant rails and the free ends of the extensions of the rearmost E section channel bars.

GEORGE HAROLD WENHAM.